US009268201B1

(12) United States Patent
Montgomery (10) Patent No.: US 9,268,201 B1
(45) Date of Patent: Feb. 23, 2016

(54) BREAKAWAY MAGNETIC MOUNT

(71) Applicant: John Montgomery, Honolulu, HI (US)

(72) Inventor: John Montgomery, Honolulu, HI (US)

( * ) Notice: Subject to any disclaimer, the term of this patent is extended or adjusted under 35 U.S.C. 154(b) by 0 days.

(21) Appl. No.: 13/726,350

(22) Filed: Dec. 24, 2012

(51) Int. Cl.
*A47G 29/00* (2006.01)
*F16M 11/00* (2006.01)
*G03B 17/56* (2006.01)
*A47F 1/14* (2006.01)
*A47G 1/16* (2006.01)
*B60R 1/02* (2006.01)
*H01Q 1/12* (2006.01)
*A01K 97/10* (2006.01)
*A45B 25/28* (2006.01)
*A47G 25/12* (2006.01)
*A47G 33/12* (2006.01)

(52) U.S. Cl.
CPC .................... *G03B 17/561* (2013.01)

(58) Field of Classification Search
CPC ........... H01F 1/00; H01F 7/00; H01F 7/0252; F01F 2007/00; F16M 9/00; F16M 13/02; F16M 13/00; F16M 13/005; F16M 11/10; B63B 25/002; B63B 35/7933; G03B 29/00; G03B 17/56
USPC ........... 248/683, 548, 549, 467, 176.1, 206.5, 248/900
See application file for complete search history.

(56) References Cited

U.S. PATENT DOCUMENTS

| | | | | |
|---|---|---|---|---|
| 3,081,054 A * | 3/1963 | Westervelt | ............... | G06F 17/00 116/28 R |
| 3,786,383 A * | 1/1974 | Ludwig | .................... | H01F 7/066 335/222 |
| 5,895,018 A * | 4/1999 | Rielo | ..................... | A47K 10/12 248/206.5 |
| 5,938,492 A * | 8/1999 | Carlini | ................ | B63B 35/7933 441/75 |
| 6,739,567 B1 * | 5/2004 | Curtis | ................... | E01F 9/0116 248/519 |
| 7,226,026 B2 * | 6/2007 | Lin | ......................... | B60R 11/00 248/183.1 |
| 7,377,474 B2 * | 5/2008 | Curtis | ................... | E01F 9/0116 248/165 |
| 7,699,277 B2 * | 4/2010 | Bagnall | ................ | A01K 63/006 119/230 |
| 8,152,389 B1 * | 4/2012 | Lammens | .............. | F16M 11/10 396/419 |
| 8,191,846 B2 * | 6/2012 | Bresolin | .............. | A01K 63/006 248/205.5 |
| 8,567,744 B1 * | 10/2013 | Marn et al. | .................... | 248/548 |
| 8,837,928 B1 * | 9/2014 | Clearman | ........... | E05B 17/2019 206/316.2 |
| 8,870,475 B1 * | 10/2014 | Bennett | ................ | G03B 17/561 396/419 |
| 2005/0088812 A1 * | 4/2005 | Hillman | ................. | F16M 11/04 361/679.07 |
| 2006/0176655 A1 * | 8/2006 | Hillman | ................. | F16M 11/04 361/679.06 |
| 2010/0061711 A1 * | 3/2010 | Woodman | ............. | B63B 25/002 396/428 |
| 2010/0237206 A1 * | 9/2010 | Barker | ................... | F16M 11/04 248/206.5 |
| 2010/0289288 A1 * | 11/2010 | Smith | ................. | B60R 13/0206 296/35.1 |
| 2015/0215483 A1 * | 7/2015 | Farnsworth | ........ | H04N 1/00541 348/207.1 |

* cited by examiner

*Primary Examiner* — Jonathan Liu
*Assistant Examiner* — Muhammad Ijaz
(74) *Attorney, Agent, or Firm* — Plager Schack LLP; Vito Canuso (57) ABSTRACT

A break-away camera mount comprising a support for supporting a camera case steadily above the surfboard, first and second magnetic connectors each configured to magnetically engage each other, but permit detachment upon sufficient shear and/or transverse force being applied to the mount, a base configured to secure the first magnetic connector to the surfboard, and a tether connecting the second magnetic connector to the surfboard.

4 Claims, 7 Drawing Sheets

BREAKAWAY MAGNETIC MOUNT

BACKGROUND

The embodiments herein relate generally to a breakaway system for mounting an object above a surface and, in particular, to a breakaway camera mount for a surfboard, although many other uses are contemplated.

In the context of surfacing, by example only, one can appreciate the awesome thrill of surfing waves, particularly as waves crest over the surfer. Many have watched the ubiquitous photographs and videos that show a dazzling performance of surfing up close and personal. In order to acquire such visuals, you either need an accompanying surfer or boat to photograph or videotape the surfer, or to mount a camera on the surfer or his or her surfboard.

Cameras have been mounted to surfboards in the past, but suffer from risk of damage, simply based upon the abrupt forces placed upon the surfboard during use. Often, the camera is damaged or the mount supporting the camera is damaged. Equally disappointing, the camera is lost. Thus, a need exists to permit a means for mounting a camera on a surfboard that is subject to abrupt forces to minimizes the risk of damage to the camera and the mount, and minimizes the risk of losing the camera.

SUMMARY

Embodiments of the present invention address at least some of these needs. And, indeed, may be employed for not just supporting a camera on a surfboard but in many other applications as well. In one embodiment of the invention, in the context of a surfboard camera for example, a break-away camera mount is provided that is configured to be mounted onto a surfboard and configured to support in a water-proof environment a camera for shooting photos while the surfboard is in use. In one example, the camera mount comprises a rigid support for supporting a water-proof camera case that is itself configured to house a camera therein, the support comprising material sufficiently rigid and stable to steadily support the camera case above a top surface of the surfboard and minimize movement of the camera while the surfboard is in use.

In one embodiment of a break-away mount, the system may comprise a first and second magnetic connector, each configured to magnetically engage each other, but permit detachment upon sufficient shear and/or transverse force being applied to one of the connectors relative to the other connector. The mount may further comprise a base configured to affix the first magnetic connector to the surfboard; and means for tethering at least a portion of the mount to the surfboard, wherein the means is coupled to at least the second magnetic connector.

At least one advantage of embodiments such as those described herein, at least those used in the context of a surfboard, when the surfboard and camera mount are in use, and an abrupt force is exerted upon one of the connectors relative to the other connector, the first and second magnetic connectors may disengage, such that the first connector remains affixed to the surfboard, and the camera case and support, which are coupled to the second magnetic connector, remain tethered to the surfboard, so that the surfer may recover the camera upon recovering the surfboard.

Preferably, each of the first and second connectors comprises a hollow sleeve for housing therein at least one magnet such that the magnets are positioned so as to be attractive to each other when placed in appropriate alignment. If desired, the camera mount may include a hinge connector connecting the camera case to one end of the support to permit a user to adjust the angle of the camera relative to the surfboard and then secure the case in place so that it does not move during use.

In one embodiment, the support comprises carbon fiber, although other materials may be used in addition to or instead of carbon fiber, depending upon how rigid the user desires that an object be supported above a surface. Of course, the mount as a system of components may comprise one of many different configurations. Moreover, the mount may be used to support one or more or any number of objects above a surface upon which the mount is placed. The camera on a surfboard is just one example of an application of the type of breakaway mounts described herein.

For example, in a more generic setting, a break-away mount is provided that is configured to support any type of object steadily above a surface upon which the mount is placed, where the mount is configured to withstand an abrupt force in a manner to preserve the integrity of the mount and particularly the object. In one embodiment, the mount comprises a support having a first and second support ends, with the first support end configured to be secured to the object, and wherein the support comprising material sufficiently rigid to maintain the object above the surface when the mount is placed on the surface;

In one embodiment, a first magnetic connector is also provided that comprises a hollow sleeve configured to house therewithin at least one magnet, where the first magnetic connector comprises first and second connector ends, and the first connector end is configured to be secured to the second support end. Desirably, a second magnetic connector is provided that itself may comprises a hollow sleeve configured to house therewithin at least one magnet, where the second magnetic connector is configured to magnetically engage the second connector end of the first magnetic connector in a manner that secures each magnet within its respective hollow sleeve. With such an arrangement, the attractive force exerted by the magnets should be sufficient to provide a stable mount for the object during use, but permit detachment of the first and second magnetic connectors when an abrupt force is applied to one connector relative to the other connector.

In an alternative embodiment, one of the magnetic connectors comprises a plurality of resilient extensions, and the other magnetic connector comprises a plurality of holes sized to permit the resilient extensions to slide into the holes with a friction fit. With these features, additional resistive force against detachment can be provided by the engagement of the extensions within the holes when the first and second connectors are engaged magnetically.

BRIEF DESCRIPTION OF THE FIGURES

The detailed description of some embodiments of the invention will be as described below with reference to the accompanying Figures, wherein like numerals represent corresponding parts of the Figures.

DETAILED DESCRIPTION OF CERTAIN EMBODIMENTS

Figures 1A, 1B:
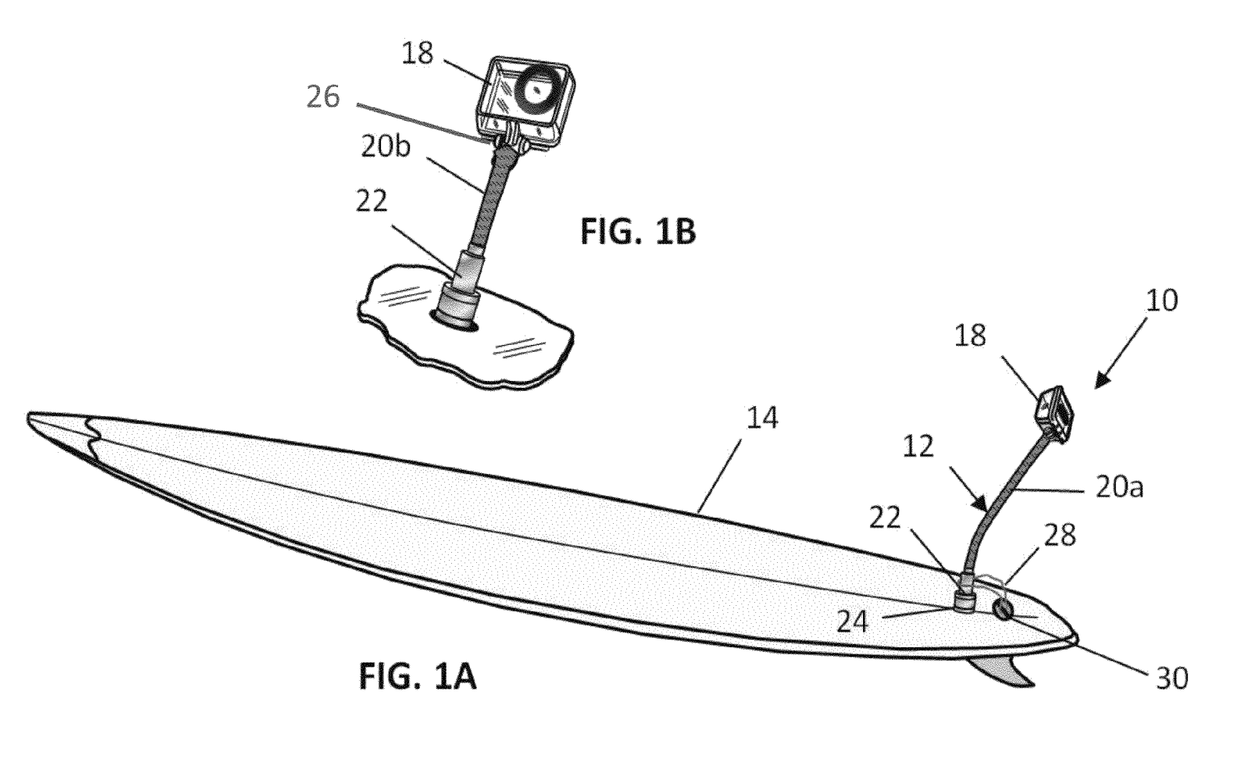
FIG. 1A is a perspective schematic view of one embodiment of the invention shown applied to a surfboard.
FIG. 1B is a perspective schematic view of an alternative embodiment of the invention of FIG. 1.

By way of example, and referring to FIG. 1A, one embodiment of the present invention 10 is shown comprising a mount 12 attached to, by example, a surfboard 14. It is important to emphasize that the surfboard is illustrated by example only, and that the mount systems described herein may be applied to numerous other surfaces for supporting one or more of numerous possible objects. In the example embodiment and example application shown in FIG. 1A, the mount 12 comprises a water-resistant or water proof camera case 18, a rigid support 20a, a breakaway connector 22, and a base 24. If desired, a portion of the mount 12 may be tethered to the surfboard 30. In one example, a tether 28, which can be a string, a rope, a cord or the like made of any type of material suitable for the context of use, connecting in one example a portion of the breakaway connector 22 to a bracket 30 on the surfboard.

Referring to FIG. 1B, an alternative embodiment is shown reflecting a much shorter and straighter support 20b between the camera case 18 and the breakaway connector 22. It should be appreciated that the point of illustration 1B is to show that there are many possible configurations for the support. Indeed, camera case 18 may be representative of any type of object for which a user desires to support the object above a surface. It is contemplated that the connection between the support and the object may be fixedly coupled in a non-movable manner or hingably coupled with a hinge connector 26, to permit adjustment in the position of the object relative to the surface and/or the support. Referring to FIGS. 1A and 1B, the supports 20a, 20b are fairly rigid but permit some degree of adjustability, so that the hinge connector may not be necessary. But where the support is configured to resist adjustment and is not flexible, then a hinged coupling may provide the flexibility desired by the user in adjusting the position of the supported item relative to the surface upon which it is mounted.

Figures 2A, 2B:
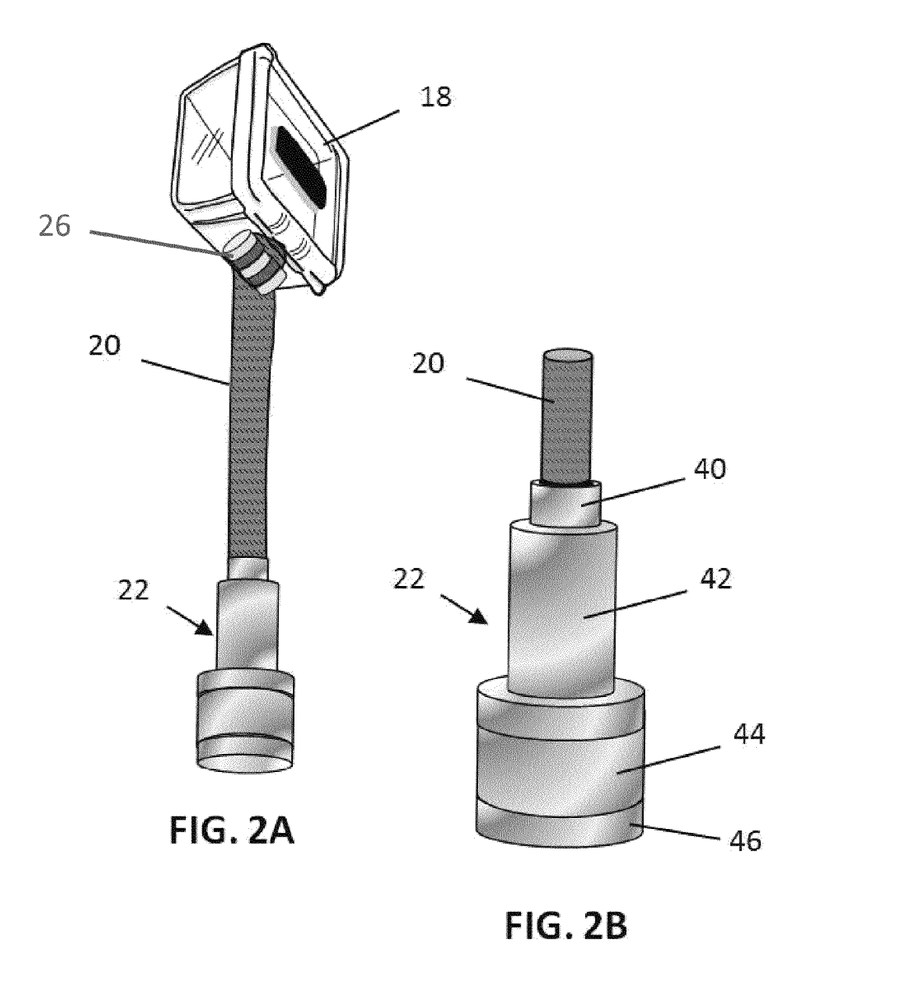
FIG. 2A is a close up perspective schematic view of the embodiment of FIG. 1B.
FIG. 2B is a detailed perspective schematic view of a portion of the embodiment of FIG. 2A.

With reference to FIGS. 2A and 2B, more detail of the breakaway connector 22 may be appreciated, wherein in one embodiment, support 20 comprises a first support end configured to connect to an object to be supported (in this case a camera case) and a second support end configured to connect to the breakaway connector 22. In one embodiment, by example, a breakaway connector 22 suitable for one of numerous applications, may comprise a support collar 40, a first magnetic connector 42, a second magnetic connector 44 and a base 46. It should be appreciated that in other embodiments, the breakaway connector 22 may comprise simply a first and second magnetic connector 42, 44, each configured to eliminate the need for a support collar and a base.

Where in one embodiment the breakaway connector 22 comprises the four components shown in FIG. 2B, examples of how each of such components may be configured can be explained with reference to FIGS. 3A through 3E. In that regard, support collar 40 may be comprise a hollow component 50, such as a tube or cylinder, where the interior portion of the collar is configured to accept therein one end of the support 20. If desired, the support end of support 20 may be secured to the support collar via a mechanical fastener, for example, through opening 52. Adhesive may be used in the alternative.

Figure 3A:
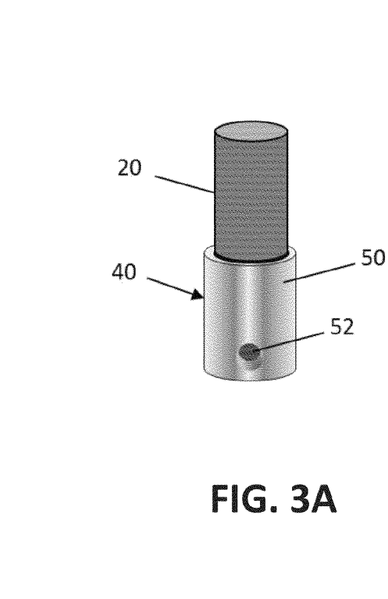
FIGS. 3A through 3E are perspective schematic views of components of the embodiment of FIG. 2B.
Figure 3B:
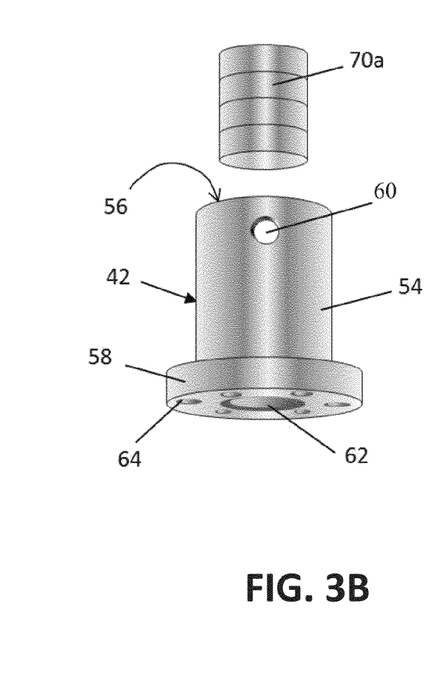
Figure 3C:
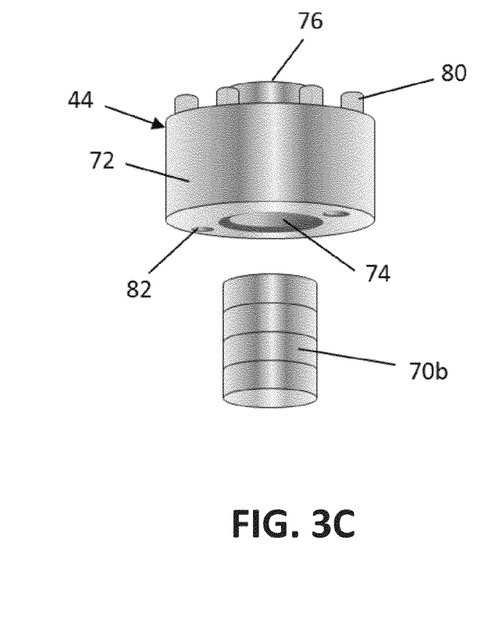

Referring to FIG. 3B, the first magnetic connector 42 comprises a hollow component 54 having an internal volume 56. If desired, a flange 58 may be provided at one end of the first magnetic connector and a tether hole 60 at the other end. Where a flange is provided, an interior volume 62 may be provided surrounded by one or more holes 64 at least partially if not entirely through the flange 58 thickness. The interior volume 56 is configured to receive therein one or more magnets 70a. In this one exemplary embodiment, a second magnetic connector 44 is configured, as shown in FIG. 3C, to engage first magnetic connector 42. In that regard, second magnetic connector 44 comprises a hollow component 72 having an interior volume 74 at a first end, and a protrusion 76 at the other end. The interior volume 74 is configured to receive therein one or more magnets 70b. Like wise, the protrusion 76 is configured to be received within interior volume 62 of the first magnetic connector 42.

If desired, one or more resilient extensions 80 may be provided surrounding protrusion 76 on the second magnetic connector 44, where each extension 80 is configured to slideably engage the holes 64 of first magnetic connector 42. When magnets 70a are housed within first magnetic connector 42, and magnets 70b are housed within second magnetic connector 44, the two magnetic connectors may be joined together to permit the attractive forces of the two (sets of) magnets to bind the first and second magnetic connectors together. The attractive force may be determined by the type and quantity of magnets 70a, 70b employed within the first and second magnetic connectors 42, 44. The object is to maintain sufficient engagement for regular use of the mount, but permit detachment when an abrupt force of a certain level is encountered against one of the magnetic connectors relative to the other one.

The optional flange 58 with interior volume 62 and protrusion 76 of the second magnetic connector 44 permit clean alignment of the first and second magnetic connectors. In addition, the optional flange 58 with hole or holes 64, along with protrusion(s) 80 of second magnetic connector 44, permit additional resistance against detachment of the first and second magnetic connectors when an abrupt force is experienced.

Figure 3D:
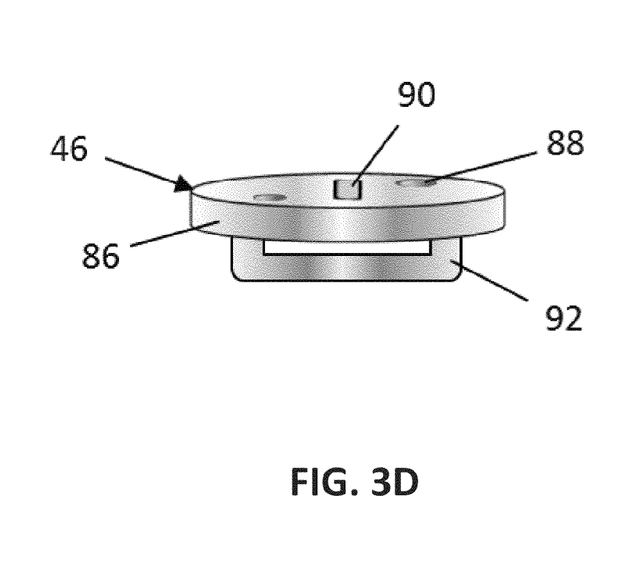
Figure 3E:
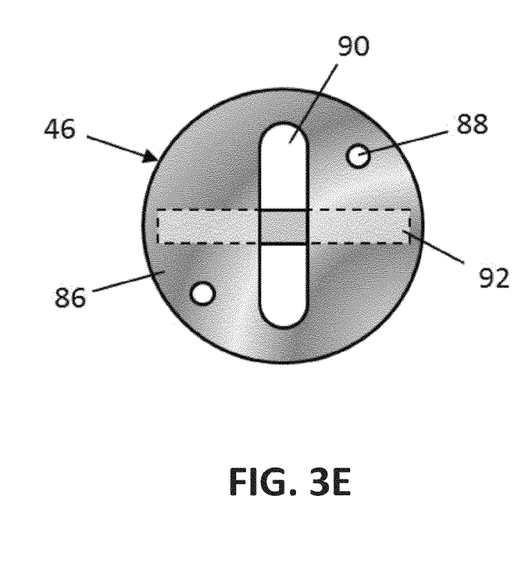
Figure 5A:
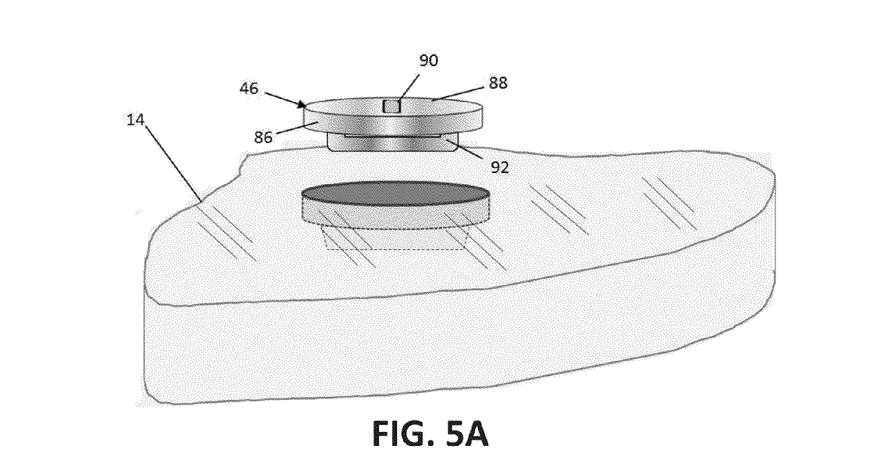
FIGS. 5A and 5B show perspective schematic views of the component of FIGS. 3D and 3E as applied to a surfboard.
Figure 5B:
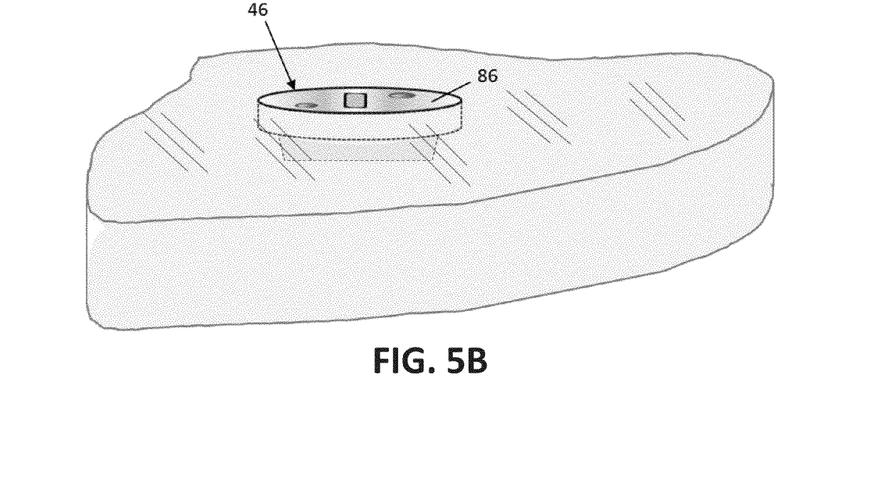

Referring to FIGS. 3D and 3E, optional base 46 may comprise a flange 86 comprising one or more attachment holes 88 and a channel 90 through a portion of the flange. In one embodiment, an extension 92 is also provided. With such an arrangement, the base 46 may be applied to a surface, such as a surfboard, with an opening in the surface configured to accept the shape and size of the base 46 in a manner that permits the top surface of the base 46 to sit flush with the top surface of the surfboard. Such an example is shown in FIGS. 5A and 5B, where surfboard 14 comprises an opening into which the base 46 may be secured so as to sit flush. Of course, other embodiments of bases may be employed in which at least some may be configured to be secured directly to the top surface of the surfboard or what other surface the breakaway mount is desired to be placed.

Figure 4:
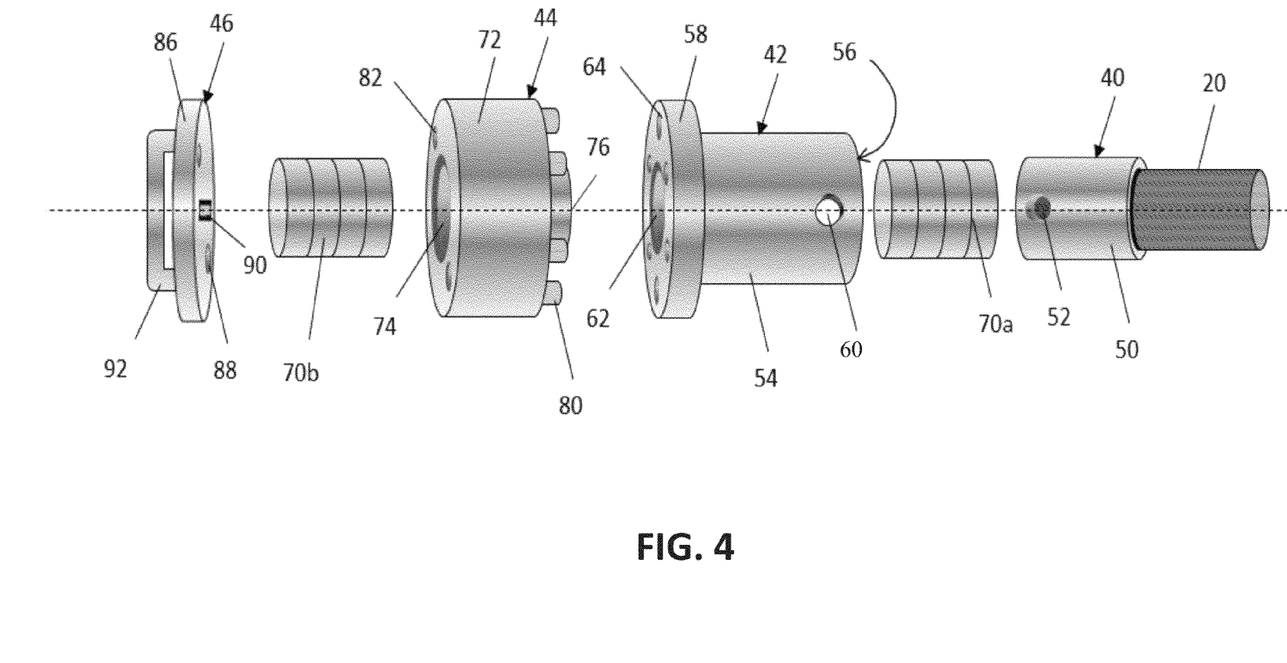
FIG. 4 is an exploded perspective schematic view of the embodiment of FIG. 2B.
Figure 6A:
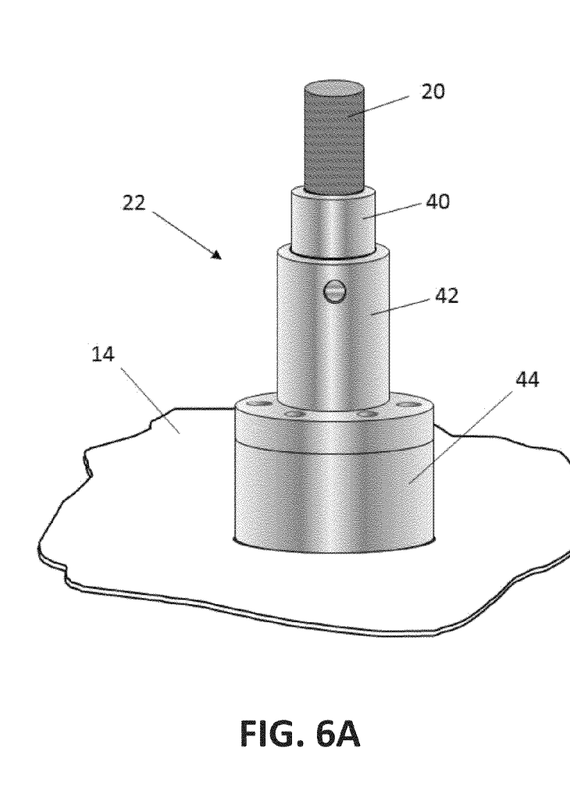
FIGS. 6A and 6B show perspective schematic views of the component of FIG. 2B, in attached and detached formats.
Figure 6B:
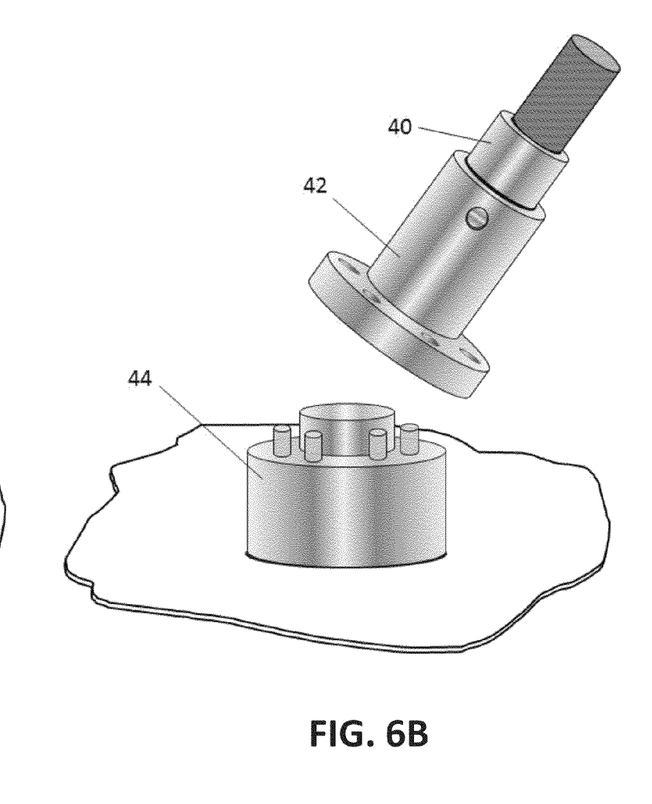

With reference to FIG. 4, one can appreciate that relative placement of the components described in FIGS. 3A through 3E. Turning to FIGS. 6A and 6B, the assembled breakaway connector 22 is shown in an attached form and a detached form. It should be appreciated by persons of ordinary skill in the art that numerous design configurations may be employed to achieve at least a portion of the functionality described herein. For example, breakaway connector 22 is shown being generally cylindrical in shape. However, other external shapes may be equally suitable. Similarly, the configuration of engaging members of each component may be varied, while still permitting the desired engagement. For example, the protrusion 76 of the second magnetic connector 44 may be of an entirely different geometry than that shown, where the interior volume 62 of the first magnetic connector 42 should be configured to accept the protrusion therein. And, as indicated above, the present invention may be used in other applications beyond supporting a camera on a surfboard, whether its supporting a camera on body board, paddle boards wakeboards, wind surfboards, or kite boards, or supporting a camera on a kayak or other water-, land- or air-based vehicle, or supporting lights or other protruding objects on water-, land- or air-based vehicles, including motorcycles. Thus, the scope of the invention is reflected by the breadth of the claims below rather than narrowed by the embodiments described above.

What is claimed is:

1. A break-away camera mount configured to be mounted onto a surfboard, the mount configured to support in a waterproof environment a camera for shooting photos while the surfboard is in use, the camera mount comprising a water proof camera case, a substantially rigid support configured to permit some degree of adjustability, a base, one or more first magnets, one or more second magnets a first connector and a second connector, wherein:

the water-proof camera case is configured to house a camera therein; the substantially rigid support is configured to support the camera case above a top surface of the surfboard when the break-away camera mount is in use, the substantially rigid support comprising material suitable to minimize movement of the camera while the surfboard is in use while still permitting a user to adjust the position of the camera case relative to the surfboard and relative to the user when the surfboard is in use, the substantially rigid support having a first end configured to be pivotally secured to the water-proof camera case and a second end;

the base is configured to be secured to a surfboard;

the first connector is configured to be secured to the second end of the substantially rigid support and having an internal bore configured to secure therewithin one or more of the first magnets; and the second connector is configured to be secured to the base and to engage the first connector, the second connector comprising a first outward projection configured to extend into the internal bore of the first connector, the second connector comprising a central bore configured to secure therewithin one or more of the plurality of magnets aligned longitudinally relative to the connectors, each connector when magnets are positioned therein configured to magnetically engage each other for secure connection during use of the break-away camera mount on the surfboard while permitting detachment of one connector from the other upon sufficient shear and/or transverse force being applied to one of the connectors relative to the other connector, the connectors configured so that the magnets form a single column of magnets when positioned within the first and second connectors, the first or second connector comprising a plurality of second projections made of resilient material, the second projections positioned radially about one of the central bore or the internal bore into which one or more of the second magnets are positioned, the second projections each configured to fit within corresponding radially-positioned holes in the other of the first or second connector to ensure alignment of the first and second connectors and to resist disengagement of the first and second connectors during normal use;

and whereby when the surfboard and camera mount are in use, and an abrupt force is exerted upon one of the connectors relative to the other connector, the first and second connectors may disengage without causing destruction to either the camera mount or to the surfboard.

2. The camera mount of claim 1, further comprising a hinge connector connecting the camera case to one end of the substantially rigid support, the hinge connector configured to permit the surfboard user to adjust the angle of the camera relative to the surfboard and then secure the case in place so that it does not move during use.

3. The camera mount of claim 1, wherein the substantially rigid support comprises carbon fiber.

4. The camera mount of claim 1, further comprising means for tethering at least a portion of the camera mount to the surfboard, wherein one end of the tethering means is configured to be coupled to either the camera case or the first connector, and wherein another end of the tethering means is configured to be coupled to a surfboard, such that when the first and second connectors may disengage, the second connector remains affixed to the surfboard, and the camera case and the substantially rigid support, which are coupled to the first connector, remain tethered to the surfboard so that the surfer may recover the camera upon recovering the surfboard.

\* \* \* \* \*